May 24, 1960  W. R. KIRCHNER ET AL  2,937,705
FARM IMPLEMENT BAR
Filed May 20, 1955
Fig. 1
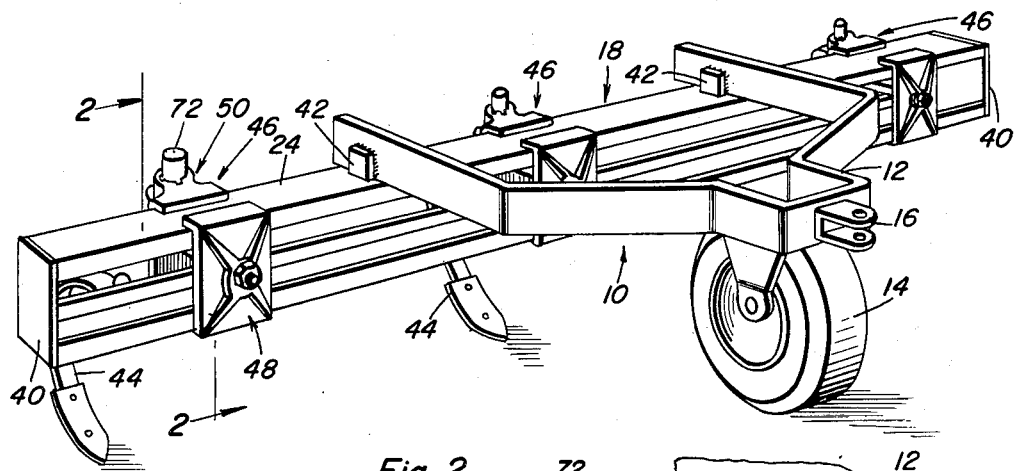
Fig. 2
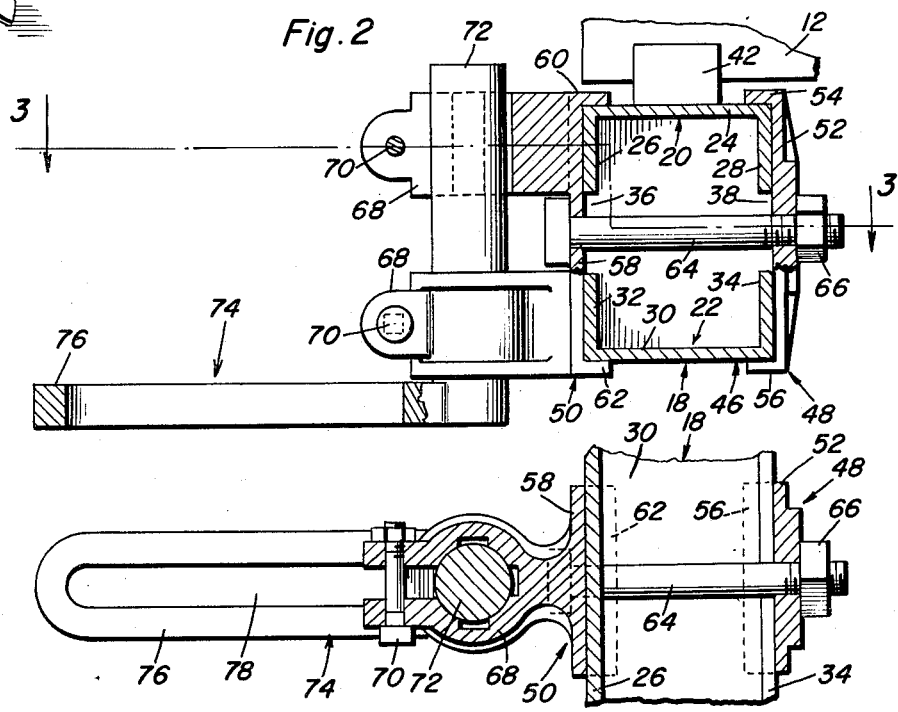
Fig. 3
William R. Kirchner
Ernest Kirchner
INVENTORS
BY Clarence A. O'Brien
and Harvey B. Jacobson
Attorneys United States Patent Office 2,937,705
Patented May 24, 1960

2,937,705

FARM IMPLEMENT BAR

William R. Kirchner and Ernest Kirchner, both of 131 Schley St., Newark, N.J.

Filed May 20, 1955, Ser. No. 509,738

1 Claim. (Cl. 172—655)

This invention relates generally to new and useful improvements in farm implements, and more specifically to an improved farm implement support bar.

In farming operations the same general frame structure is utilized for many different purposes. For example, the frame may have attached thereto first plows or rolling coulters for the purpose of plowing the land. Then the frame may have attached thereto suitable cultivator shovels for cultivating the plants or forming furrows in which seeds may be planted. Also, in farming it is desired that various crops be planted in different row spaces. Accordingly, it is desirable that there be provided means whereby implements may be quickly and easily attached to a supporting frame and at the same time may be readily adjustable.

It is therefore the primary object of this invention to provide an improved implement bar which is so constructed whereby implement supporting clamps carried thereby may be readily adjustable transversely of a frame to which the implement bar is attached so that the row spacing of the implements may be varied with a minimum of effort and loss of time.

Another object of this invention is to provide an improved implement bar for the reception of implement clamps, the implement bar being so constructed whereby it is provided with openings extending the length thereof, the openings being adapted to have received therethrough bolts for attachment to the implement clamps so that the implement clamps may be slid along the bar transversely of a supporting frame to vary the row spacing of the implements as desired.

A further object of this invention is to provide an improved implement clamp assembly which includes an implement bar having an opening extending the length thereof and the implement clamp including clamp plates disposed on opposite sides of the bar and having a fastener extending through the opening in the bar for selectively clamping the clamp plates on the bar at various positions along the length of such bar.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a farm implement utilizing the implement bar and implement clamp structure which are the subject of this invention;

Figure 2 is an enlarged fragmentary vertical sectional view taken substantially upon the plane indicated by the section line 2—2 of Figure 1 and shows the specific details of the implement clamp assembly including the relationship of the implement clamp with respect to the implement bar; and Figure 3 is an enlarged fragmentary sectional view taken substantially upon the plane indicated by the section line 3—3 of Figure 2 and shows further the specific details of the implement clamp assembly.

Referring now to the drawings in detail, it will be seen that there is illustrated a farm implement which is referred to in general by the reference numberal 10. The farm implement 10 includes a generally Y-shaped frame 12 which has secured to the forward portion thereof a swivel wheel 14. The forward end of the frame 12 is provided with a suitable hitch 16 so that the implement 10 may be attached to a tractor or the like. It is to be understood that the frame may be varied to be used with any type of tractor and may be used without the wheel 14.

Secured to the rear portion of the frame 12 is a transversely disposed implement bar which is referred to in general by the reference numeral 18. The implement bar 18 is generally box-shaped in configuration and is formed of a pair of channel members 20 and 22. The channel members 20 and 22 are identical with the channel member 20 including an upper web 24 and the flanges 26 and 28. The channel member 22 includes a lower web 30 and upstanding flanges 32 and 34. The opposed edges of the flanges 26 and 32, and the flanges 28 and 34 are in spaced relation to form aligned openings 36 and 38, respectively. The ends of the channel members 20 and 22 are secured together by end plates 40.

In order that the implement bar 18 may be attached to the frame 12, there is secured to the web 24 at spaced intervals upstanding blocks 42. The blocks 42 are secured to the frame 12 by any suitable fastening means and may be positioned as desired.

Carried by the implement bar 18 at spaced intervals is a plurality of implements in the form of spring cultivators 44. The spring cultivators 44 are secured to the implement bar 18 by clamps which are referred to in general by the reference numeral 46.

Each of the clamps 46 includes a front clamp member 48 and a rear clamp member 50. The clamp members 48 and 50 are both of channel-shaped cross-section.

The clamp member 48 includes a vertical web 52 disposed in abutting engagement with the flanges 28 and 34. The clamp member 48 also includes an upper flange 54 which overlies the web 26 and the lower flange 56 which underlies the web 30.

The clamp member 50 includes a vertical web 58 which abuts against the flanges 26 and 32. The clamp member 50 also includes an upper flange 60 which overlies the web 24 and a lower flange 62 which underlies the web 30.

Extending through central portions of the clamp members 48 and 50 is an elongated bolt 64. The bolt 64 also extends through the openings 36 and 38 and is provided with a nut 66. The nut 66 is adjustably threaded on the bolt 64 to tightly clamp the clamp members 48 and 50 against the implement bar 18.

The web 58 and clamp member 50 is provided with vertically spaced aligned split collars 68. The split collars 68 are provided with adjustable fasteners 70 to permit the clamping of a shaft 72 of an implement support 74 therein. The implement support 74 also includes a horizontal arm or leg 76 which includes an elongated slot 78. The slot 78 will receive fasteners (not shown) utilized to clamp the spring cultivator shovels 44 or other similar implements to the implement clamp 74.

From the foregoing description of the present invention, it will be seen that the relationship between the implement clamps 46 and the implement bar 18 is such that the implement clamps 46 may be shifted along the length of the implement bar 18 to any position desired. Accordingly, it will be readily apparent that the row spacing of implements carried by the implement bar 18 may be varied as desired with a minimum of effort. Also, because a single bolt is utilized to secure the components of the implement clamp 46 to the implement bar 18, the implement clamps 46 may be removed from or added to the implement bar 18 as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A farm implement support assembly comprising: a horizontal bar including opposed upper and lower channel members, end plates rigidly connecting said channel members in vertically spaced relation for defining parallel, longitudinally extending slots therebetween, a pair of generally U-shaped vertical plates mounted astraddle the longitudinal marginal portions of the bar and bridging the slots, a bolt operable in the slots and connecting the second named plates for clamping said second named plates in position on othe bar, a pair of split, aligned, vertically spaced clamps on one of the second named plates, and means for adjustably mounting a tool on said clamps, said means including a vertical shaft frictionally secured for sliding and rotary adjustment in the clamps, and a right-angularly extending, longitudinally slotted arm on the lower end portion of said shaft for attachment to the tool.

References Cited in the file of this patent

UNITED STATES PATENTS

| | | |
|---|---|---|
| 371,275 | Pope | Oct. 11, 1887 |
| 633,333 | Beall | Sept. 19, 1899 |
| 724,005 | Hall | Mar. 31, 1903 |
| 1,098,563 | Ferguson | June 2, 1914 |
| 1,437,032 | White | Nov. 28, 1922 |
| 1,684,894 | Smiley | Sept. 18, 1928 |
| 1,988,618 | Blaschke | Jan. 22, 1935 |
| 2,662,458 | Ermey | Dec. 15, 1953 |
| 2,687,075 | Hupp | Aug. 24, 1954 |